US009740495B2

(12) United States Patent
Guo et al.

(10) Patent No.: US 9,740,495 B2
(45) Date of Patent: *Aug. 22, 2017

(54) IMPLEMENTING OUT OF ORDER PROCESSOR INSTRUCTION ISSUE QUEUE

(71) Applicant: International Business Machines Corporation, Armonk, NY (US)

(72) Inventors: Chen Guo, San Jose, CA (US); John Ho, Fremont, CA (US); Ziad Saliba, Union City, CA (US); Arash Shokouhbakhsh, San Jose, CA (US); Cheng-Fu F. Tsai, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 240 days.

This patent is subject to a terminal disclaimer.

(21) Appl. No.: 14/628,188

(22) Filed: Feb. 20, 2015

(65) Prior Publication Data

US 2015/0363206 A1 Dec. 17, 2015

Related U.S. Application Data

(63) Continuation of application No. 14/306,328, filed on Jun. 17, 2014, now Pat. No. 9,569,222.

(51) Int. Cl.
*G06F 9/38* (2006.01)
*G06F 9/30* (2006.01)

(52) U.S. Cl.
CPC .......... *G06F 9/3855* (2013.01); *G06F 9/3005* (2013.01); *G06F 9/3836* (2013.01)

(58) Field of Classification Search
None
See application file for complete search history.

(56) References Cited

U.S. PATENT DOCUMENTS

| 6,178,497 | B1 | | 1/2001 | Frederick, Jr. et al. |
| 6,594,270 | B1 | * | 7/2003 | Drummond-Murray ... H04Q 11/0478 370/353 |
| 6,650,586 | B1 | * | 11/2003 | Fanning ............... G11C 11/4087 365/222 |
| 7,350,056 | B2 | | 3/2008 | Abernathy et al. |
| 7,949,855 | B1 | | 5/2011 | Mills et al. |
| 8,380,964 | B2 | * | 2/2013 | Bishop ................. G06F 9/3855 712/214 |
| 8,521,991 | B2 | * | 8/2013 | Wang .................... G06F 9/3836 712/214 |

(Continued)

OTHER PUBLICATIONS

IBM TDB "Method for a partially queued scheduling algorithm for out-of-order processors" IPCOM000008307D; (Jun. 2002).

(Continued)

*Primary Examiner* — Eric Coleman
(74) *Attorney, Agent, or Firm* — Joan Pennington

(57) ABSTRACT

A method and apparatus are provided for implementing an enhanced out of order processor instruction issue queue in a computer system. Instructions are selectively accepted into an instruction issue queue and ages are assigned to the accepted queue entry instructions using a queue counter. The queue entry instructions are issued based upon resources being ready and ages of the instructions. Ages of the queue entry instructions and the queue counter are selectively decremented, responsive to issuing instructions.

8 Claims, 25 Drawing Sheets

(56) References Cited

U.S. PATENT DOCUMENTS

| | | | |
|---|---|---|---|
| 2007/0074005 A1* | 3/2007 | Abernathy | G06F 9/3814 |
| | | | 712/214 |
| 2007/0083742 A1 | 4/2007 | Abernathy et al. | |
| 2008/0320478 A1 | 12/2008 | Singh et al. | |
| 2009/0063735 A1 | 3/2009 | Ng et al. | |
| 2010/0332804 A1* | 12/2010 | Golla | G06F 9/3838 |
| | | | 712/214 |
| 2010/0332806 A1 | 12/2010 | Golla et al. | |
| 2012/0260069 A1 | 10/2012 | Bishop et al. | |
| 2013/0179664 A1 | 7/2013 | Olson et al. | |
| 2013/0205118 A1 | 8/2013 | Buyuktosunoglu et al. | |

OTHER PUBLICATIONS

Michaud et al., "Data-Flow Prescheduling for Large Instruction Windows in Out-of-Order Processors" Proceedings of the 7th International Symposium on High-Performance Computer Architecture, pp. 27-36, 2001.

* cited by examiner

ENTRY FIELDS 500

| INSTRUCTION | AGE BITS | READY | EMPTY |

FIG. 5

900
ISSUING OLDEST INSTRUCTIONS
AGE MATRIX 16 ENTRY QUEUE (120 BITS)

| ROW | 15 | 14 | 13 | 12 | 11 | 10 | 9 | 8 | 7 | 6 | 5 | 4 | 3 | 4 | 1 | 0 |
|---|---|---|---|---|---|---|---|---|---|---|---|---|---|---|---|---|
| 15 | X | | | | | | | | | | | | | | | |
| 14 | A1 | X | | | | | | | | | | | | | | |
| 13 | B1 | B2 | X | | | | | | | | | | | | | |
| 12 | C1 | C2 | C3 | X | | | | | | | | | | | | |
| 11 | D1 | D2 | D3 | D4 | X | | | | | | | | | | | |
| 10 | E1 | E2 | E3 | E4 | E5 | X | | | | | | | | | | |
| 9 | F1 | F2 | F3 | F4 | F5 | F6 | X | | | | | | | | | |
| 8 | G1 | G2 | G3 | G4 | G5 | G6 | G7 | X | | | | | | | | |
| 7 | H1 | H2 | H3 | H4 | H5 | H6 | H7 | H8 | X | | | | | | | |
| 6 | I1 | I2 | I3 | I4 | I5 | I6 | I7 | I8 | I9 | X | | | | | | |
| 5 | J1 | J2 | J3 | J4 | J5 | J6 | J7 | J8 | J9 | J10 | X | | | | | |
| 4 | K1 | K2 | K3 | K4 | K5 | K6 | K7 | K8 | K9 | K10 | K11 | X | | | | |
| 3 | L1 | L2 | L3 | L4 | L5 | L6 | L7 | L8 | L9 | L10 | L11 | L12 | X | | | |
| 2 | M1 | M2 | M3 | M4 | M5 | M6 | M7 | M8 | M9 | M10 | M11 | M12 | M13 | X | | |
| 1 | N1 | N2 | N3 | N4 | N5 | N6 | N7 | N8 | N9 | N10 | N11 | N12 | N13 | N14 | X | |
| 0 | O1 | O2 | O3 | O4 | O5 | O6 | O7 | O8 | O9 | O10 | O11 | O12 | O13 | O14 | O15 | X |

FIG. 9

IMPLEMENTING OUT OF ORDER PROCESSOR INSTRUCTION ISSUE QUEUE

This application is a continuation application of Ser. No. 14/306,328 filed Jun. 17, 2014.

FIELD OF THE INVENTION

The present invention relates generally to the data-processing field, and more particularly, to a method and apparatus for implementing enhanced out of order processor instruction issue queue in a computer system.

DESCRIPTION OF THE RELATED ART

Modern multi-threaded processor architectures must balance a way to wait for an instruction's resources to be ready and take into account the age of that instruction in relation to other instructions.

Typically a queue first-in first-out (FIFO) like system is used to hold the instructions while waiting for resources to be ready. As instruction resources become ready and the instruction is sent out from the queue, holes can be created in the queue that must be reused to make room for new instructions. To resolve the available queue holes, queue entries are shifted towards the bottom of the queue to make room for new instructions at the top of the queue. This allows the system to choose instructions as they become ready from the bottom of the queue which represents older instructions. This design results in a large amount of power usage due to shifting to accept new instructions. Combining this power resource characteristic with the increasing rate of instructions dispatching to the queue in modern processors and the queue becomes a large power liability for the system.

U.S. patent application publication US 20120260069, published Oct. 11, 2012 to Bishop et al. and assigned to the present assignee, discloses an information handling system including a processor with an instruction issue queue (IQ) that may perform age tracking operations. The issue queue IQ maintains or stores instructions that may issue out-of-order in an internal data store (IDS). The IDS organizes instructions in a queue position (QPOS) addressing arrangement. An age matrix of the IQ maintains a record of relative instruction aging for those instructions within the IDS. The age matrix updates latches or other memory cell data to reflect the changes in IDS instruction ages during a dispatch operation into the IQ. During dispatch of one or more instructions, the age matrix may update only those latches that require data change to reflect changing IDS instruction ages. The age matrix employs row and column data and clock controls to individually update those latches requiring update.

A need exists for an efficient and effective method and apparatus for implementing an enhanced out of order processor instruction issue queue in a computer system. It is desirable to provide such out of order processor instruction issue queue having reduced power requirements over conventional arrangements, for example that allows for out of order instruction issuing to occur in a multi-pipelined processor architecture without the need for instruction shifting in the queue which is very power intensive.

SUMMARY OF THE INVENTION

A principal aspect of the present invention is to provide a method and apparatus for implementing enhanced out of order processor instruction issue queue in a computer system. Other important aspects of the present invention are to provide such method and apparatus substantially without negative effects, and that overcome many of the disadvantages of prior-art arrangements.

In brief, a method and apparatus are provided for implementing an enhanced out of order processor instruction issue queue in a computer system. Instructions are selectively accepted into an instruction issue queue and ages are assigned to the accepted queue entry instructions using a queue counter. The instructions are selectively issued based upon resources being ready and ages of the queue entry instructions. Ages of the queue entry instructions and the queue counter are selectively decremented, responsive to issuing instructions.

In accordance with features of the invention, selectively accepting instructions into the instruction issue queue allows for holes in the instruction issue queue to be filled and ages assigned to prepare the instruction to be issued based on being the oldest instruction with dependencies of the instruction being ready, eliminating the conventional shifting of instructions with queue entries towards the bottom of the queue to make room for new instructions at the top of the queue, and avoiding such power intensive operations.

In accordance with features of the invention, selectively accepting instructions into the instruction issue queue includes the queue counter that holds the age of the next incoming instruction, and a logic decision at the input of each queue entry that determines whether the new incoming instruction will be accepted or the current queue data will be held.

In accordance with features of the invention, when a new instruction arrives at the queue, each queue entry checks two conditions before deciding to accept the new instruction: whether the current queue entry is empty and whether there is any entry below. If both of these conditions are met, the instruction will be accepted into the current queue entry. The counter value, which represents the age of the new instruction is also appended to the new instruction and written into the queue.

In accordance with features of the invention, instructions are issued out of the queue, for example, with a series of multiplexer levels used for filtering the queue entries down to only the ready instruction that is the oldest. For example, an age matrix is used to track relationships of the valid queue entries to each other. The bits representing age relationships of the queue entries are only checked when two queue entries are being compared and both or neither are ready. If only one of the queue entries being compared is ready, it is chosen by default. If neither or both of the queue entries being compared are ready, the ages are checked. For example, the series of multiplexer levels filters down the queue entries by first comparing two queue entries, four entries, eight entries and eventually all sixteen entries. At each level, two queue entries are compared which are the results of the previous level.

In accordance with features of the invention, once an instruction has been filtered and issued out of the queue, the ages of all instructions younger than the issuing instruction is decremented. This is done by feeding back the issuing instructions age to each queue entry, comparing it to the queue entry's age, then decrementing that age if it is younger, which insures all ages in the queue are contiguous. Issuing an instruction also triggers the global counter to decrement by one.

BRIEF DESCRIPTION OF THE DRAWINGS

The present invention together with the above and other objects and advantages may best be understood from the following detailed description of the preferred embodiments of the invention illustrated in the drawings, wherein:

FIG. 5 is a block diagram illustrating example entry fields for an instruction issue queue entry in accordance with preferred embodiments;

FIG. 9 is a diagram illustrating an example age matrix for a 16 Entry Queue for issuing oldest instructions in accordance with preferred embodiments;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and system are provided for implementing an enhanced out of order processor instruction issue queue.

Figure 1:
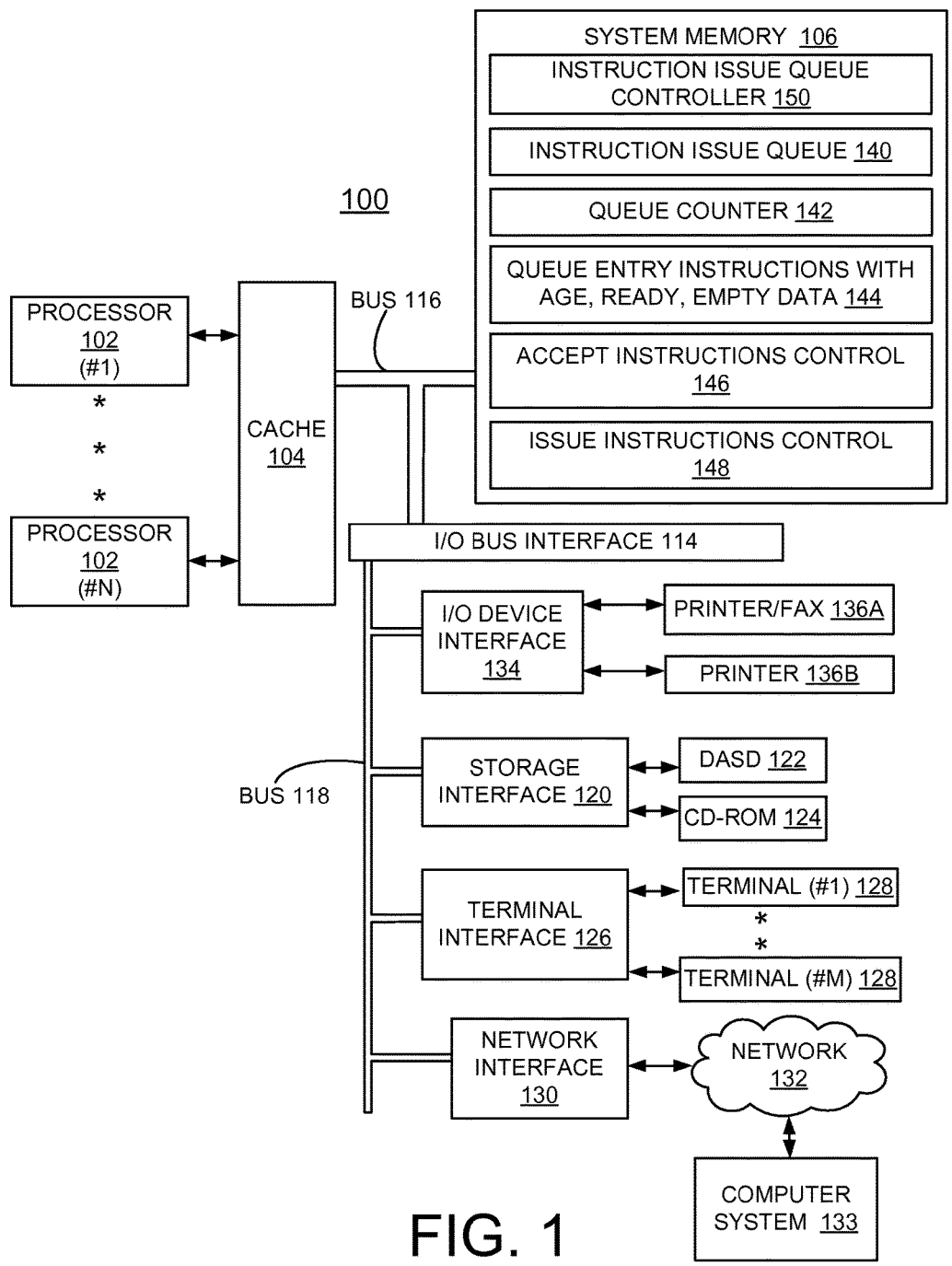
FIG. 1 is a block diagram of an example computer system for implementing enhanced out of order processor instruction issue queues in accordance with preferred embodiments.

Having reference now to the drawings, in FIG. 1, there is shown an example computer system generally designated by the reference character 100 for implementing an enhanced out of order processor instruction issue queue in accordance with the preferred embodiment. Computer system 100 includes one or more processors 102 or general-purpose programmable central processing units (CPUs) 102, #1-N. As shown, computer system 100 includes multiple processors 102 typical of a relatively large system; however, system 100 can include a single CPU 102. Computer system 100 includes a cache memory 104 connected to each processor 102.

Computer system 100 includes a system memory 106. System memory 106 is a random-access semiconductor memory for storing data, including programs. System memory 106 is comprised of, for example, a dynamic random access memory (DRAM), a synchronous direct random access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, system memory 106 and I/O bus interface 114. I/O bus interface 114 is further coupled to system I/O bus 118 for transferring data to and from various I/O units.

As shown, computer system 100 includes a storage interface 120 coupled to storage devices, such as, a direct access storage device (DASD) 122, and a CD-ROM 124. Computer system 100 includes a terminal interface 126 coupled to a plurality of terminals 128, #1-M, a network interface 130 coupled to a network 132, such as the Internet, local area or other networks, shown connected to another separate computer system 133, and a I/O device interface 134 coupled to I/O devices, such as a first printer/fax 136A, and a second printer 136B.

System memory 106 stores an instruction issue queue 140, a queue counter 142, each queue entry instruction stored with age, ready and entry data 144, an accept instructions control 146, an issue instructions control 148, and an instruction issue queue controller 150 for implementing an enhanced out of order processor instruction issue queue in a computer system in accordance with the preferred embodiments.

Computer system 100 is shown in simplified form sufficient for understanding the present invention. The illustrated computer system 100 is not intended to imply architectural or functional limitations. The present invention can be used with various hardware implementations and systems and various other internal hardware devices.

In accordance with features of the invention, enhanced out of order processor instruction issue queues are implemented enabling out of order instruction issuing to occur in a multi-pipelined processor architecture while eliminating the need for conventional instruction shifting in the queue and the large power liability for the system.

Figure 2:
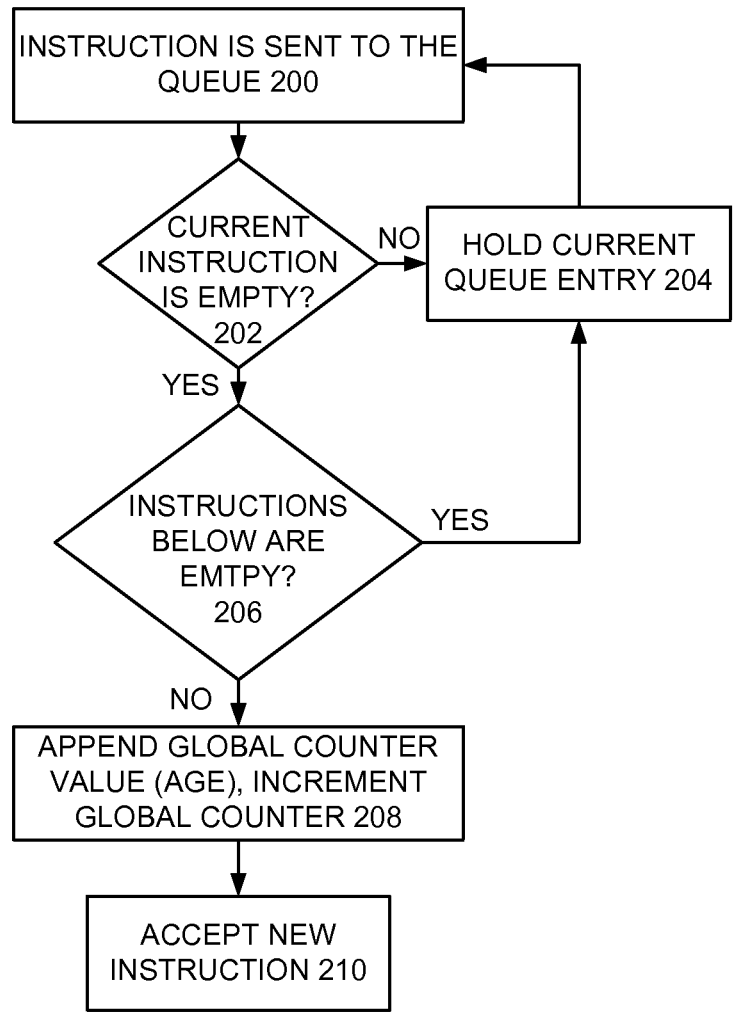
FIGS. 2 and 3 are flow charts illustrating example operations for implementing enhanced out of order processor instruction issue queues in accordance with preferred embodiments.
Figure 3:
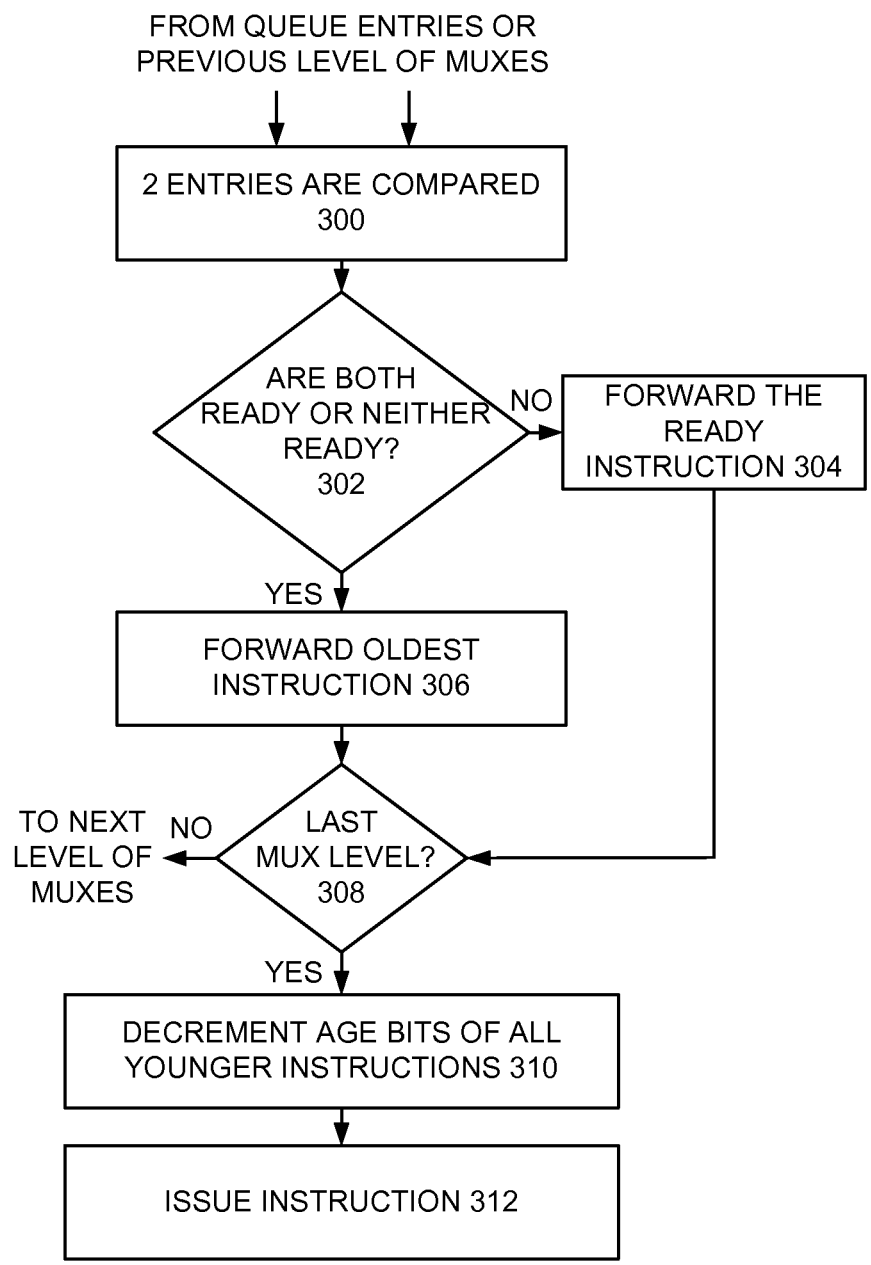

Referring to FIGS. 2 and 3, there are shown example operations for implementing enhanced out of order processor instruction issue queues in accordance with preferred embodiments. In FIG. 2, example operations are shown for accepting instructions for each entry in accordance with preferred embodiments. In FIG. 3, example operations are shown for issuing instructions in accordance with preferred embodiments.

In FIG. 2, as indicated in a block 200, an instruction is sent to the queue. In accordance with features of the invention, a logic decision at the input of each queue entry determines whether the new incoming instruction will be accepted or the current queue data will be held. Checking is performed to determine if the current instruction is empty as indicated in a decision block 202. If the current instruction is not empty, then the current queue entry is held as indicated in a block 204. If the current instruction is empty, then checking is performed to determine if the instructions below are empty as indicated in a decision block 206. If the instructions below are empty, then the current queue entry is held at block 204.

In accordance with features of the invention, a counter holds the age of the next incoming instruction. If the instructions below are not empty, then the instruction will be accepted into the current queue entry. A global counter value, which represents the age of the new instruction, is appended to the new instruction, and the global counter is incremented as indicated in a block 208. The instruction is accepted into the current queue entry as indicated in a block 210. The queue entry is also marked as being valid, or occupied. Using this method, the queue is filled, for example, an example 16 entry queue is shown in FIG. 4, and the 16 entry queue is filled using the method illustrated in FIG. 2.

In accordance with features of the invention, once instructions are in the queue, resources will gradually become ready and the instructions can be issued out of the queue. To filter the queue entries down to only the ready instruction that is the oldest, a series of multiplexer levels advantageously are used. Since age has to be taken into consideration, an age matrix is used to track relationships of the valid queue entries to each other. The bits representing age relationships of the queue entries are only checked when two queue entries are being compared and both or neither are ready. If only one of the queue entries being compared is ready, it is chosen by default. If neither or both of the queue entries being compared are ready, the ages are checked. For example, the multiplexer levels filter down the queue entries by first comparing two queue entries, four entries, eight entries and eventually all sixteen entries. At each level, two queue entries are compared which are the results of the previous level.

In FIG. 3, as indicated in a block 300, queue entries or entries from a previous level of multiplexers are received and compared. Checking is performed to determine if both the compared entries are ready or neither of the compared entries is ready as indicated in a decision block 302. If both or neither of the compared entries is not ready, then the ready instruction is forwarded as indicated at a block 304. Otherwise if both the compared entries are ready or neither of the compared entries is ready, and then the oldest instruction if forwarded as indicated at a block 306. Checking for the last multiplexer level is performed as indicated in a decision block 308. When it is not the last multiplexer level, then operations continue at a next level of multiplexers. Otherwise when it is the last multiplexer level, then the age bits of all younger instructions are decremented as indicated at a block 310 and the instruction is issued as indicated at a block 312.

Figure 4:
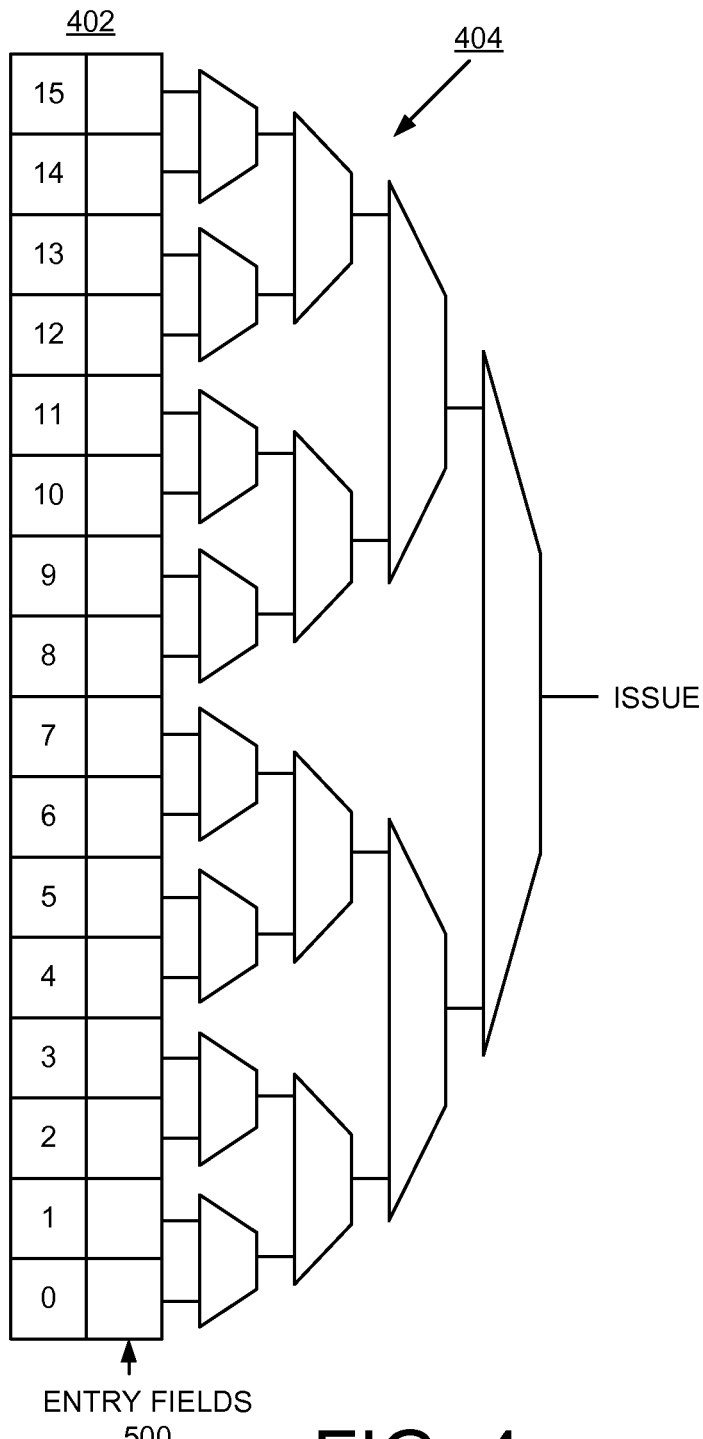
FIG. 4 is a block diagram illustrating an example enhanced out of order processor instruction issue queue structure in accordance with preferred embodiments.

Referring now to FIG. 4, there is shown example enhanced out of order processor instruction issue queue structure generally designated by the reference character 400 in accordance with preferred embodiments. The enhanced out of order processor instruction issue queue structure include a plurality of queue entries 0-15, 402 each including predefined entry fields 500, such as illustrated and described with respect to FIG. 5, and a series of multiplexer levels generally designated by the reference character 404.

Referring now to FIG. 5, there are shown example entry fields for each respective queue entry generally designated by the reference character 500 in accordance with preferred embodiments. As shown, entry fields 500 include a respective instruction, age bits, ready, and empty.

FIGS. 6A, 6B, 6C, 6D, 6E, 6F, 6G, 6H, and 6I illustrate example operations for implementing enhanced out of order processor instruction issue queues in accordance with preferred embodiments.

Figure 6A:
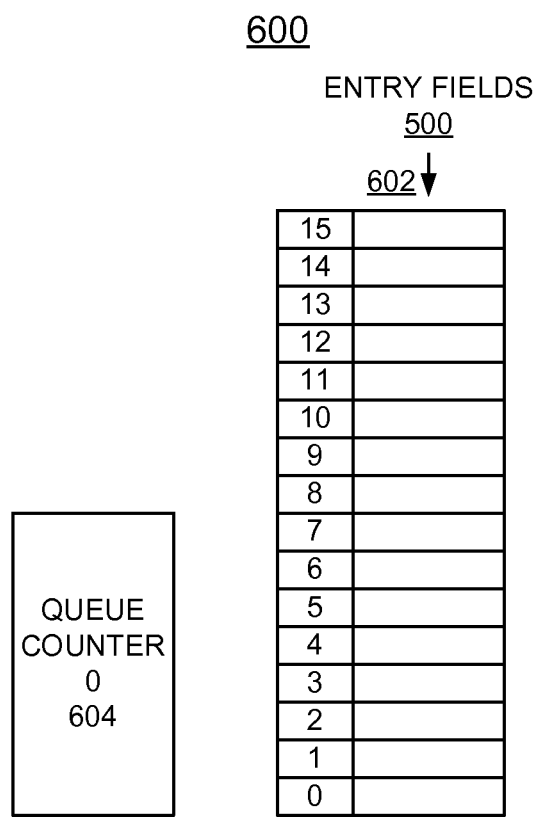
FIGS. 6A, 6B, 6C, 6D, 6E, 6F, 6G, 6H, and 6I are diagrams illustrating example operations for implementing enhanced out of order processor instruction issue queues in accordance with preferred embodiments.

In FIG. 6A, an initial operation generally designated by the reference character 600 illustrates an instruction queue 602 that is empty, with a queue counter 604 holding an age of 0 for a next incoming instruction.

Figure 6B:

In FIG. 6B, an operation generally designated by the reference character 610 illustrates a first queue entry 0 accepted into the instruction queue 602 with an age of 0 with the queue counter 604 holding an age of 1 for the next incoming instruction.

Figure 6C:
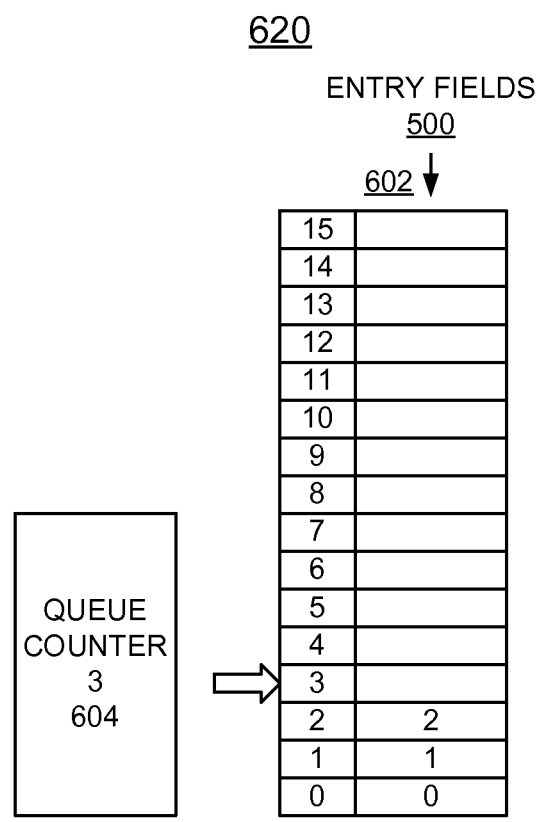

In FIG. 6C, an operation generally designated by the reference character 620 illustrates three queue entries 0, 1, and 2 accepted into the instruction queue 602 with respective ages of 0, 1, and 2 with a queue counter 604 holding an age of 3 for the next incoming instruction.

Figure 6D:
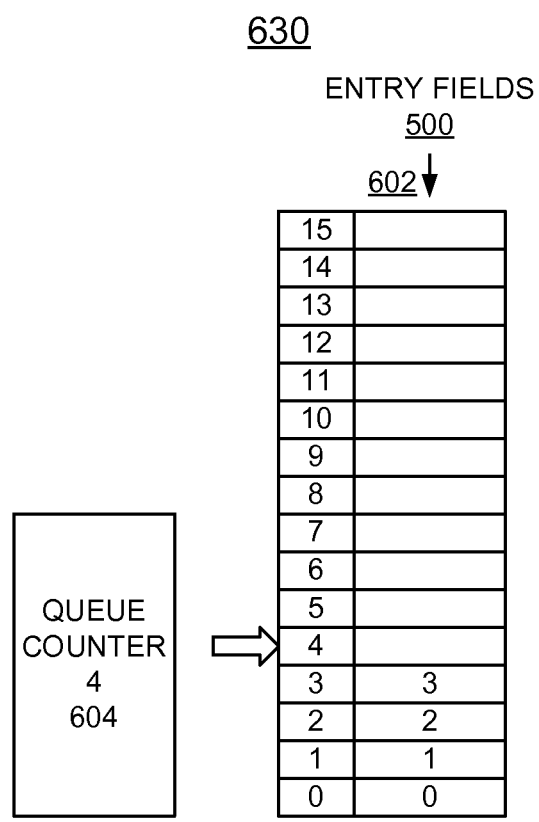

In FIG. 6D, an operation generally designated by the reference character 630 illustrates four queue entries 0, 1, 2, and 3 accepted into the instruction queue 602 with respective ages of 0, 1, 2, and 3 with a queue counter 604 holding an age of 4 for the next incoming instruction.

Figure 6E:
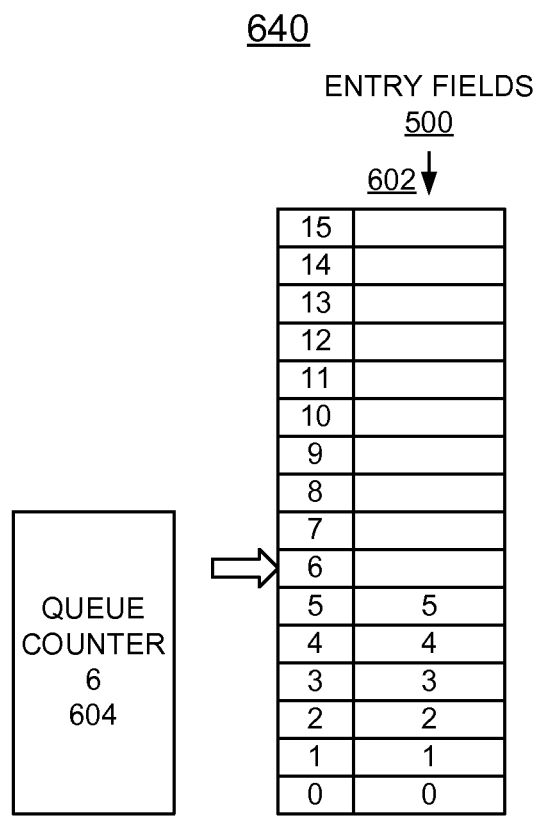

In FIG. 6E, an operation generally designated by the reference character 640 illustrates six queue entries 0, 1, 2, 3, 4, and 5 accepted into the instruction queue 602 with respective ages of 0, 1, 2, 3, 4, and 5 with a queue counter 604 holding an age of 6 for the next incoming instruction.

Figure 6F:
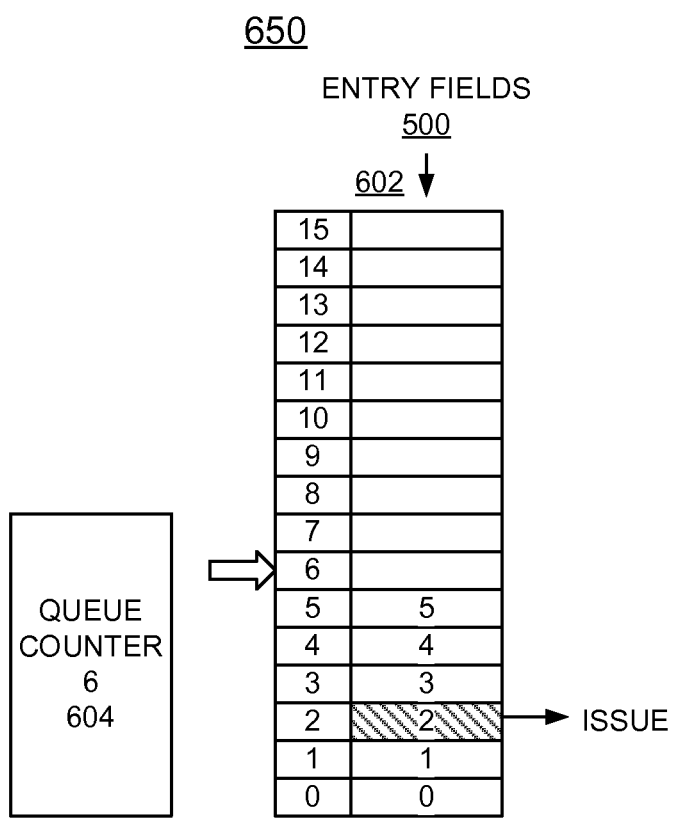

In FIG. 6F, an operation generally designated by the reference character 650 illustrates the six queue entries 0, 1, 2, 3, 4, and 5 accepted into the instruction queue 602 with respective ages of 0, 1, 2, 3, 4, and 5 with a queue counter 604 holding an age of 6 for the next incoming instruction, and queue entry 2 being issued from the instruction queue 602.

Figure 6G:
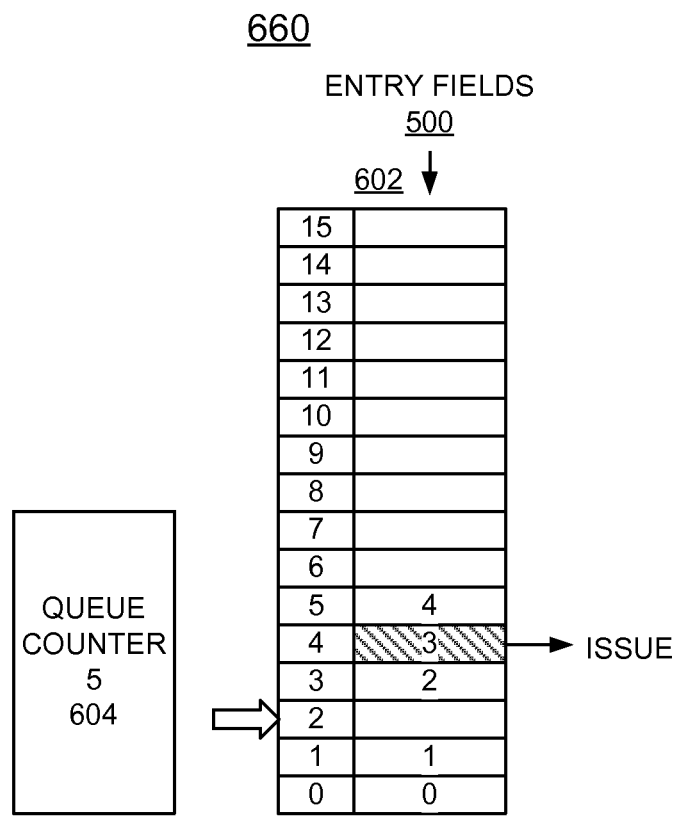

In FIG. 6G, an operation generally designated by the reference character 660 illustrates the six queue entries 0, 1, 3, 4, and 5 accepted into the instruction queue 602 with respective ages of 0, 1, 2, 3, and 4 with a hole at queue entry 2, and the queue counter 604 holding an age of 5 for the next incoming instruction, and queue entry 4 being issued from the instruction queue 602.

Figure 6H:
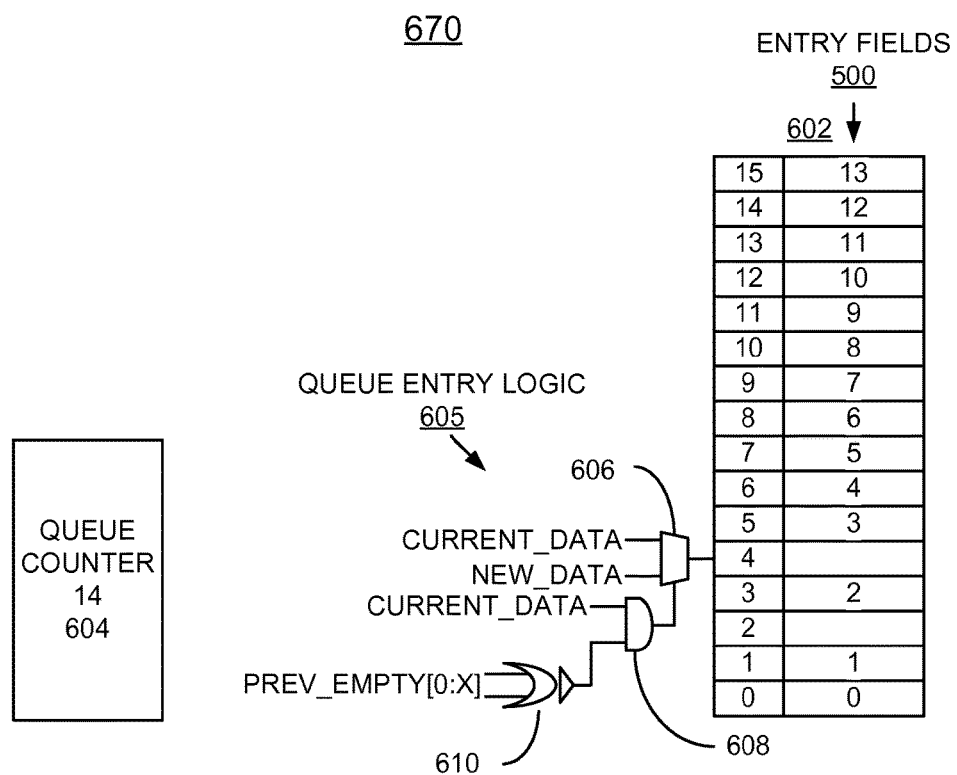
Figure 6I:
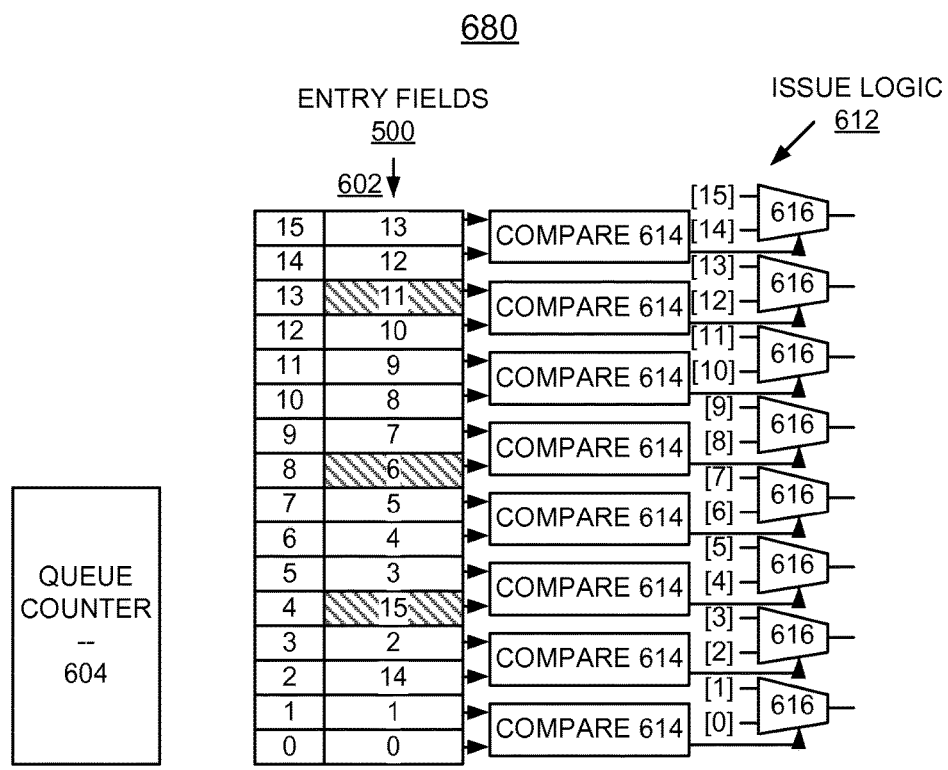

In FIG. 6H, an operation generally designated by the reference character 670 illustrates the six queue entries 0, 1, 3, and 5-15 accepted into the instruction queue 602 with respective ages of 0, 1, 2, 3-13 including holes at queue entries 2 and 4, and the queue counter 604 holding an age of 14 for the next incoming instruction. Queue entry logic 605 at queue entry 4 of instruction queue 602 includes a multiplexer 606 receiving current data and new data inputs, an AND gate 608 receiving inputs of current data input and previous empty slot data [0:X] output of NOR gate 610. The AND gate 608 provides a select input to the multiplexer 606. As shown, the queue entry logic 605 accepts the new instruction into queue slot 4 where the current slot 4 is empty and the previous slot 3 is not empty.

In FIG. 6H, an operation generally designated by the reference character 680 illustrates sixteen queue entries 0-15 accepted into the instruction queue 602 with respective ages of 0, 1, 14, 2, 15, and 3-13 for issuing an oldest instruction in progress with issue logic 612 including a plurality of comparators or compares 614, each comparing two respective queue entries and providing a select input to a respective associated multiplexers 616 each receiving the two respective queue entries.

Figure 7:
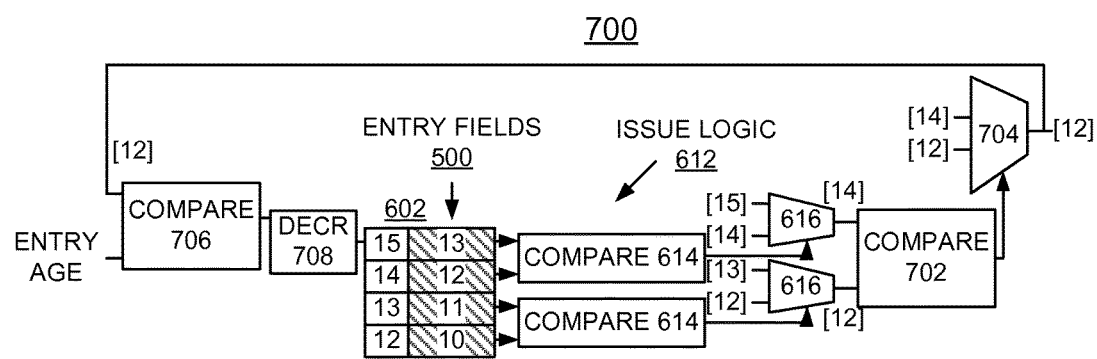
FIG. 7 is a block diagram illustrating the instruction issue queue structure with an example comparator logic for issuing oldest instructions in accordance with preferred embodiments.

Referring now to FIG. 7, there is shown example instruction issue queue structure using comparators for issuing oldest instructions generally designated by the reference character 700 with the example issue logic 612 in accordance with preferred embodiments. Instruction issue queue structure 700 includes a compare 702, which compares two respective entries from the previous level of multiplexers 616 of issue logic 612 and provides a select input to a next level multiplexer 704. The multiplexer 704 provides a feed back age input of the issuing instruction to a compare 706 comparing the age of the issuing instruction with ages of the queue entry instructions and providing an input to a decrement 708. The decrement 708 decrements ages of the queue entry instructions younger than the issuing instruction.

Figures 8A, 8B, 8C:
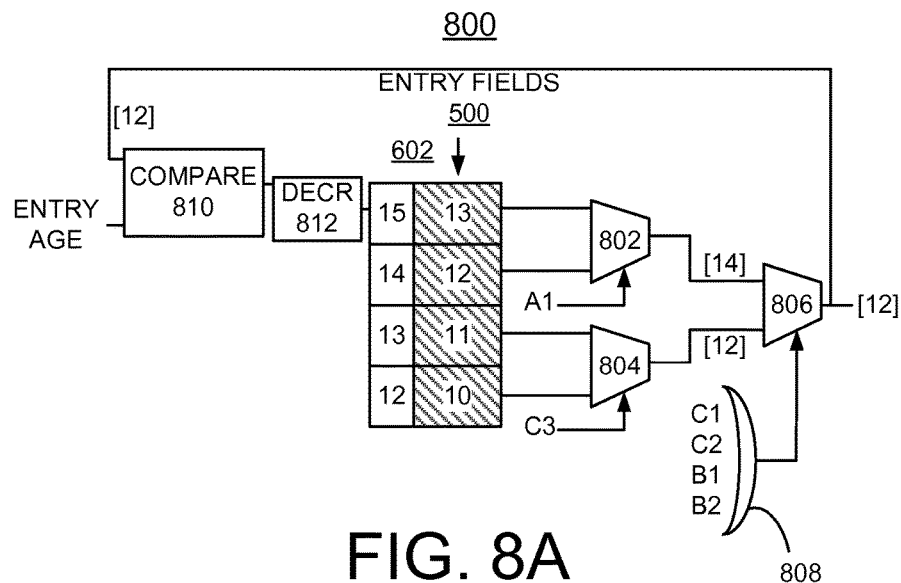
FIGS. 8A, 8B, 8C are diagrams together illustrating the instruction issue queue structure with an example age matrix logic for issuing oldest instructions in accordance with preferred embodiments.

FIGS. 8A, 8B, 8C respectively illustrating the instruction issue queue structure generally designated by the reference character 800 with an example age matrix logic generally designated by the reference character 830, 840 in FIGS. 8B, and 8C for issuing oldest instructions in accordance with preferred embodiments. The instruction issue queue structure 800 includes a first level of multiplexers 802, 804 receiving two inputs from respective queue entries and a respective select input A1, C3 from the age matrix 830 in FIG. 8B and providing respective inputs to a next level multiplexer 806 receiving a select input from OR gate 808 receiving age matrix inputs C1, C2, B1, B2 from the age matrix 830 in FIG. 8B. The multiplexer 806 provides a feed back age input of the issuing instruction to a compare 810 comparing the age of the issuing instruction with ages of the queue entry instructions and providing an input to a decrement 812 for decrementing ages of the queue entry instructions younger than the issuing instruction. In the age matrix 840 in FIG. 8C, 1 represents older and 0 represents younger.

Referring now to FIG. 9, there is shown an example age matrix generally designated by the reference character 900 for issuing oldest instructions in accordance with preferred embodiments. Age matrix 900 is shown for a 16 entry queue, for example, including 120 bits.

Figure 10:
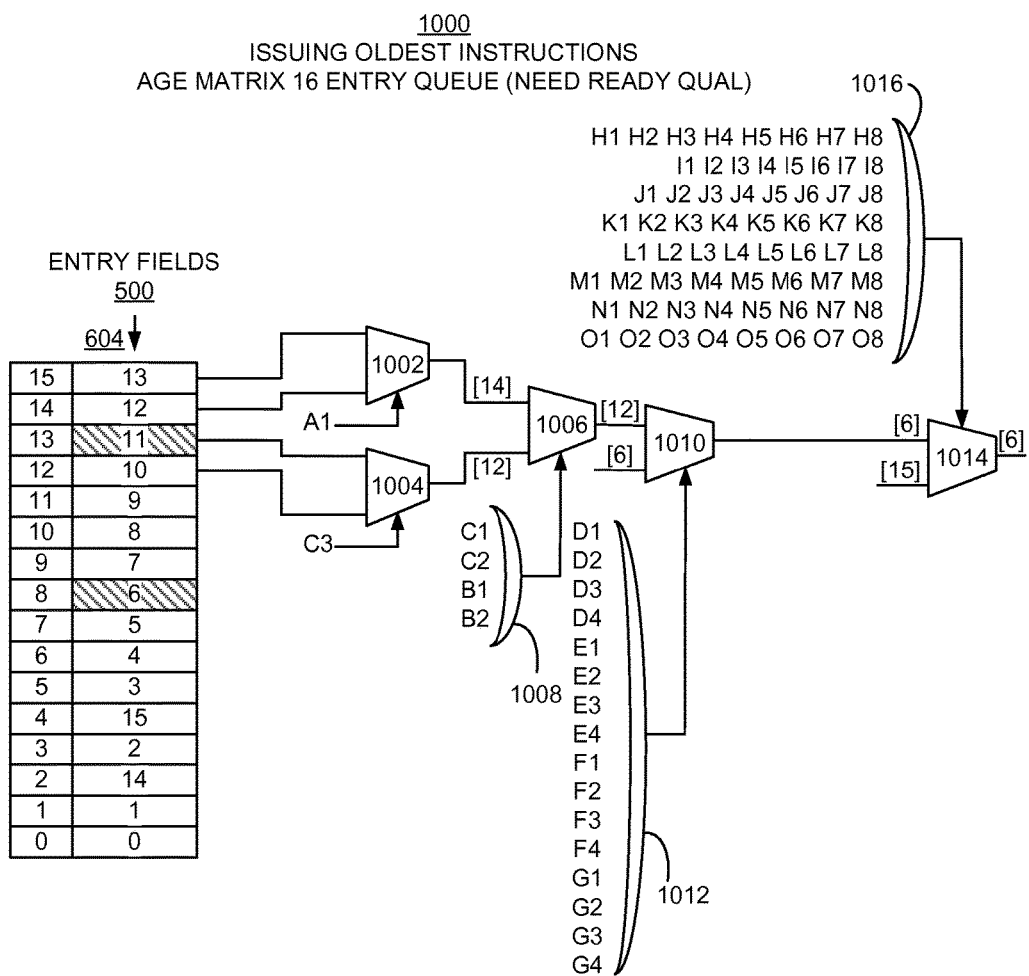
FIG. 10 is a diagram illustrating the instruction issue queue structure with an example multiplexer age matrix 16 Entry Queue check ready logic for issuing oldest instructions in accordance with preferred embodiments.

Referring now to FIG. 10, there is shown instruction issue queue structure generally designated by the reference character 1000 with inputs from the example multiplexer age matrix 900 with check ready logic needed to check ready with age for issuing oldest instructions in accordance with preferred embodiments. The instruction issue queue structure 1000 includes a first level of multiplexers 1002, 1004 receiving two inputs from respective queue entries and a respective select inputs A1, C3 from the age matrix 900 in FIG. 9 and providing respective inputs to a next level multiplexer 1006 receiving a select input from OR gate 1008, which receives age matrix inputs C1, C2, B1, B2 from the age matrix 900. The multiplexer 1006 provides an input to a next level multiplexer 1010 receiving a select input from OR gate 1012, which receives age matrix inputs D1, D2, D3, D4, E1, E2, E3, 34, F1, F2, F3, F4, G1, G2, G3, G4 from the age matrix 900. The multiplexer 1010 provides an input to a next level multiplexer 1014 receiving a select input from OR gate 1016, which receives age matrix inputs H1-H8, I1-I8, J1-J8, J1-J8, K1-K8, L1-L8, M1-M8, N1-N8, O1-O8 from the age matrix 900.

Figure 11:
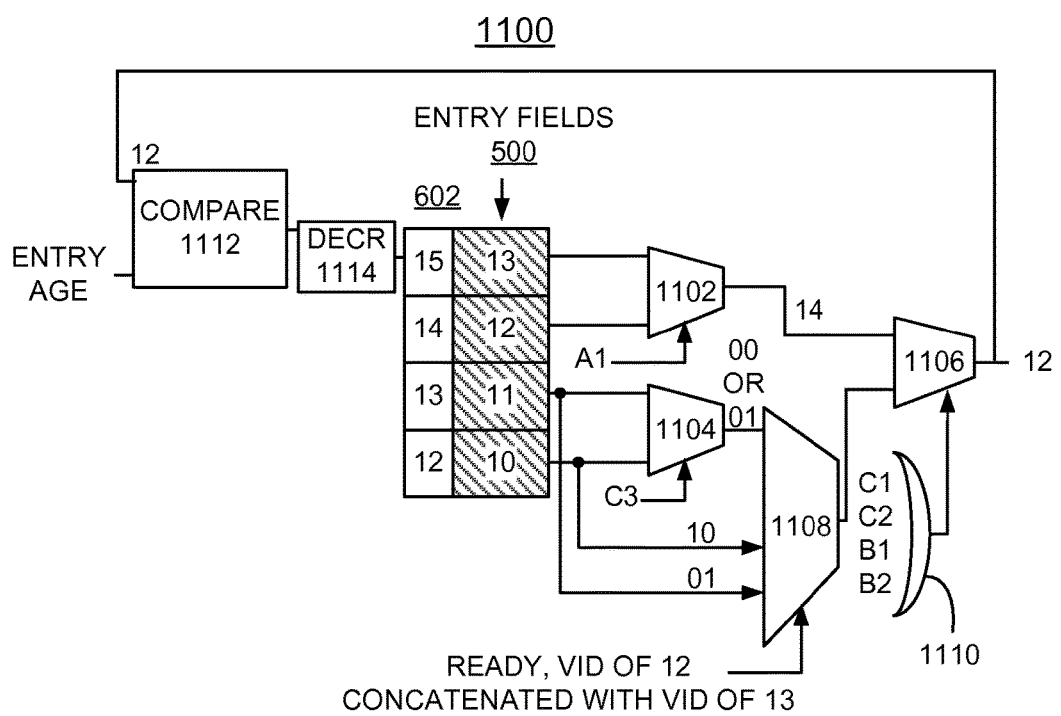
FIG. 11 is a diagram illustrating the instruction issue queue structure with an example multiplexer entry age check ready logic, VID of 12 concatenated with VID of 13 for issuing oldest instructions in accordance with preferred embodiments.

Referring now to FIG. 11, there is shown instruction issue queue structure generally designated by the reference character 1100 with an example multiplexer entry age check ready logic, VID of 12 concatenated with VID of 13 for issuing oldest instructions in accordance with preferred embodiments. The instruction issue queue structure 1100 includes a first level of multiplexers 1102, 1104 receiving respective select inputs A1, C3 from the age matrix 900 and providing respective inputs to a pair of next level multiplexer 1006, 1008. Multiplexer 1006 receives a select input from OR gate 1110 receiving age matrix inputs C1, C2, B1, B2 from the age matrix 900. Multiplexer 1008 receives two age inputs from two queue entries 12, 13, and receives a select input of ready of the VID of 12 concatenated with VID of queue entry 13. An output of multiplexer 1008 provides an input to the multiplexer 1106. The multiplexer 1106 provides a feed back age input of the issuing instruction to a compare 1112 comparing the age of the issuing instruction with ages of the queue entry instructions and providing an input to a decrement 1114 for decrementing ages of the queue entry instructions younger than the issuing instruction.

Figure 12:
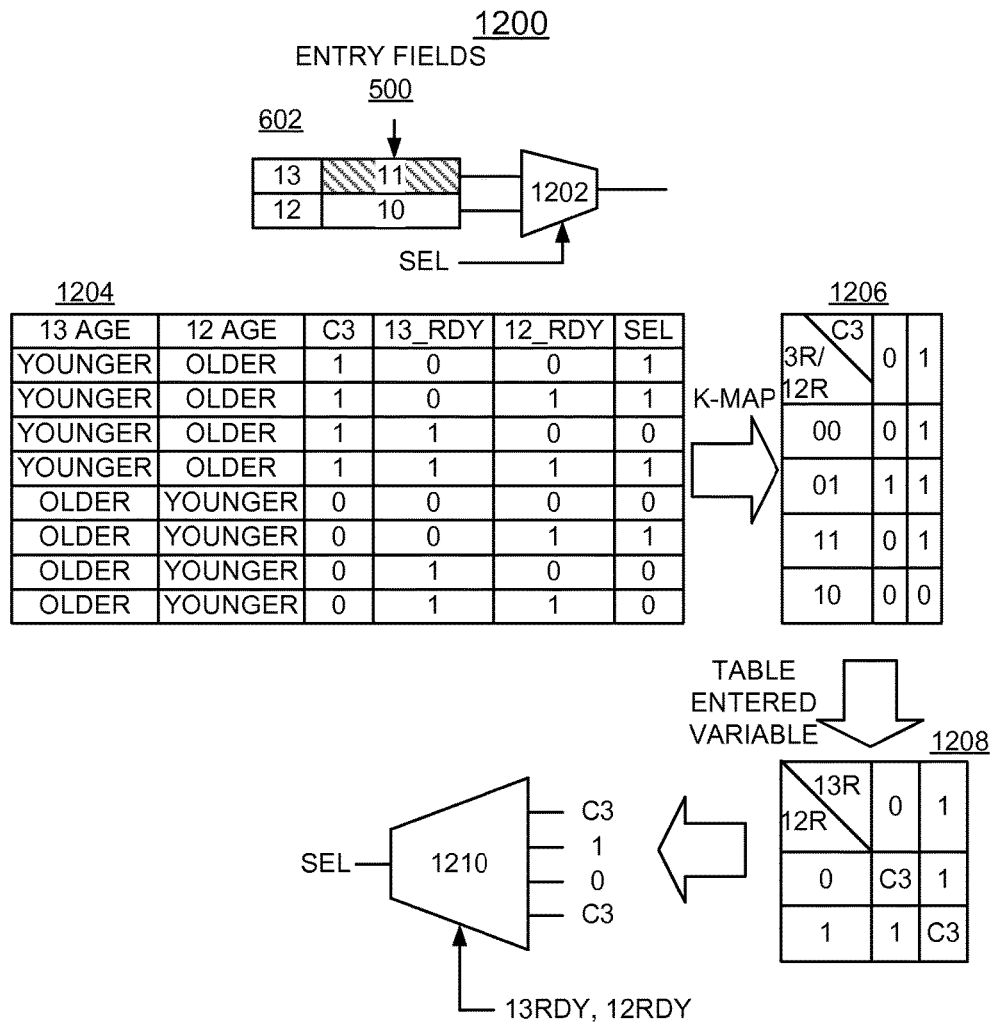
FIG. 12 is a diagram illustrating the instruction issue queue structure with an example multiplexer age logic for issuing oldest instructions in accordance with preferred embodiments.

Referring now to FIG. 12, there is shown example instruction issue queue structure generally designated by the reference character 1200 with an example age ready logic for issuing oldest instructions qualified with ready dependency in accordance with preferred embodiments. In the instruction issue queue structure 1200, the illustrated queue entries 12, 13 are compared and checked if both the compared entries are ready or neither of the compared entries is ready. If both the compared entries are ready or neither of the compared entries is ready, then the oldest instruction if forwarded, otherwise if both or neither of the compared entries are not ready, then the ready instruction is forwarded.

Instruction issue queue structure 1200 shows example queue entries 12 and 13 of issue queue 602 with respective ages of 10, 11. Queue entries 12 and 13 are applied to a multiplexer 1202 receiving a select input generated with an age ready logic matrix 1204 providing a K-Map input to an age ready table matrix 1206, which provides a tabled entered variable to an age ready table matrix 1208, which provides inputs to a multiplexer 1210. As shown, multiplexer 1210 receives inputs C3, 1, 0, C3 from the age ready table matrix 1208, and receives a select input of 13RDY, 12RDY.

Figure 13:
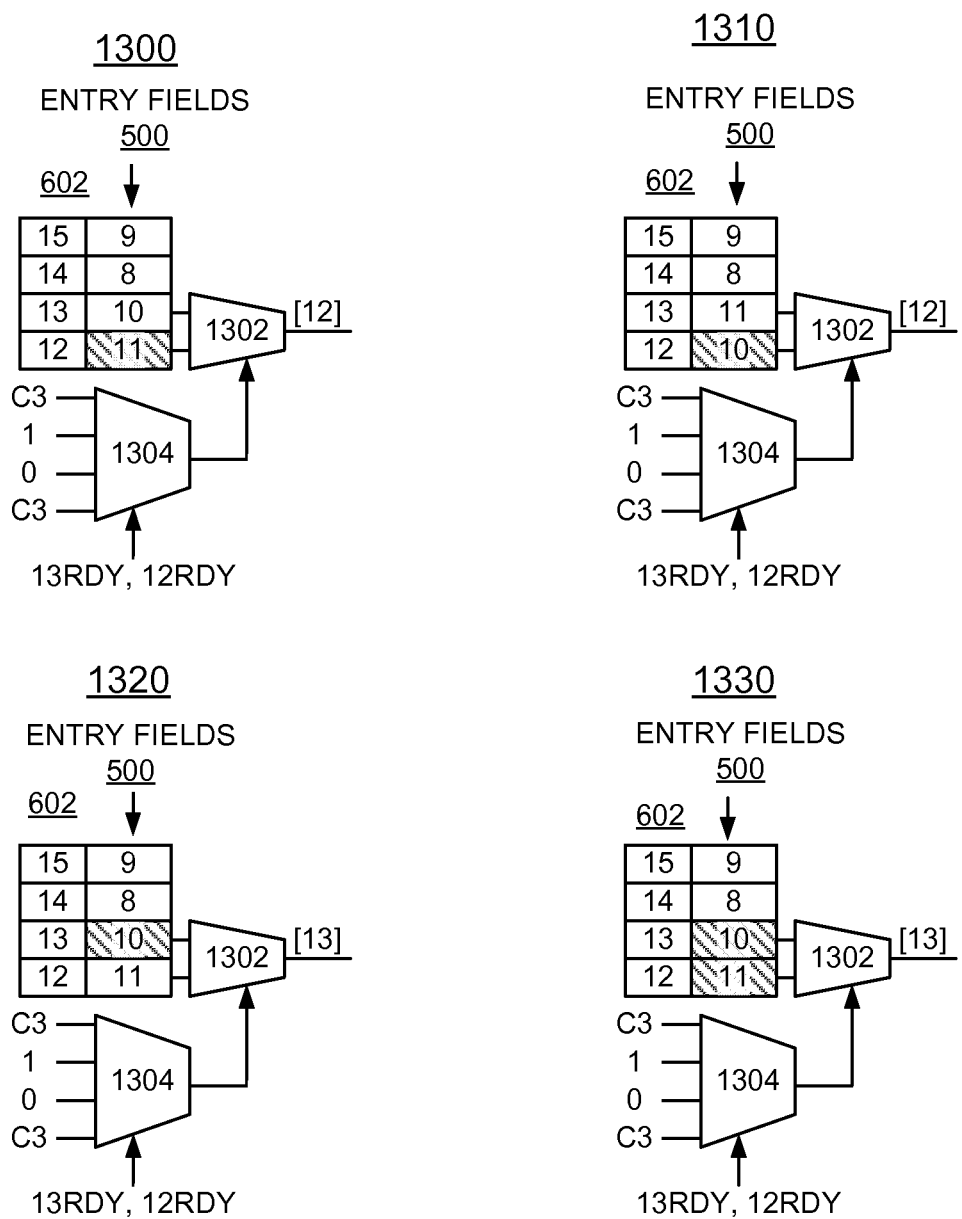
FIG. 13 is a diagram illustrating instruction issue queue structure examples with multiplexer age check ready logic for issuing oldest instructions in accordance with preferred embodiments.

Referring now to FIG. 13, there are shown instruction issue queue structure examples respectively generally designated by the reference characters 1300, 1310, 1320, and 1330 with multiplexer age check ready logic for issuing oldest instructions in accordance with preferred embodiments. In the illustrated examples 1300, 1310, 1320, and 1330, entry fields 500 of the illustrated issue queues 602 show an age with ready queue entry indicated by shaded lines. In the illustrated examples 1300, 1310, 1320, and 1330, queue entries 12 and 13 are applied to a multiplexer 1302 receiving a select input from an output of a multiplexer 1304. Age ready logic inputs C3, 1, 0, C3 are applied to multiplexer 1304, for example, the inputs C3, 1, 0, C3 are from the age ready table matrix 1208 of FIG. 12. In examples 1300, 1310, 1320, respective ready instructions 12, 12, 13 are passed forward, and in example 1330, the oldest instruction 13 is passed forward with both instructions 12, and 13 ready.

Figure 14:
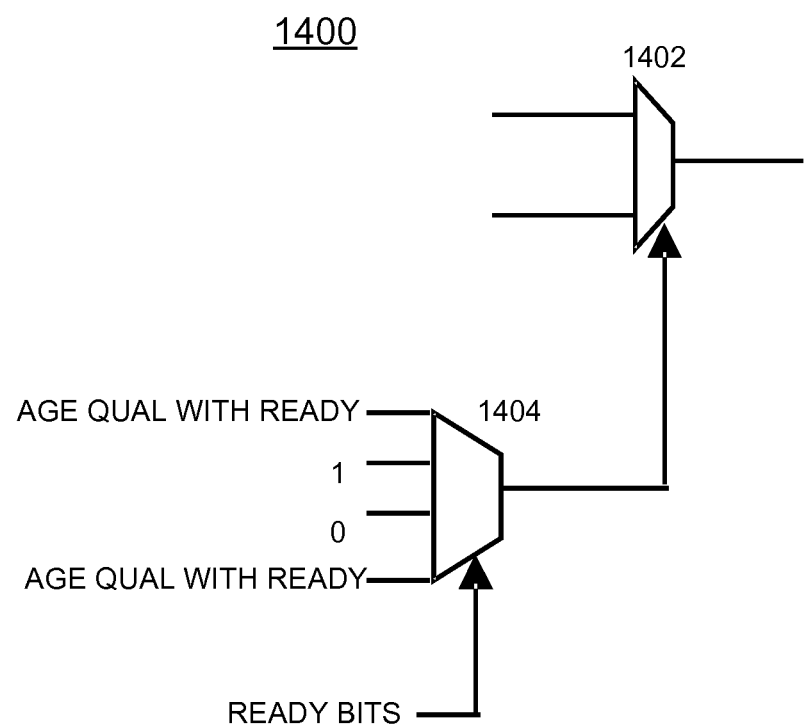
FIG. 14 is a diagram illustrating an example general multiplexer age ready logic for issuing oldest instructions in accordance with preferred embodiments.

FIG. 14 provides an example general multiplexer age ready logic generally designated by the reference characters 1400 for issuing oldest instructions in accordance with preferred embodiments. Multiplexer age ready logic 1400 includes a first multiplexer 1402 and a second multiplexer 1404. Two queue entries or two entries from a previous level of multiplexers are applied to the multiplexer 1402, which receives a select input from an output of a multiplexer 1404. Multiplexer 1404 receives a select input from ready bits. Age ready logic inputs C3, 1, 0, C3 are applied to multiplexer 1404, for example, the inputs C3, 1, 0, C3 are from the age ready table matrix 1208 of FIG. 12.

Figure 15:
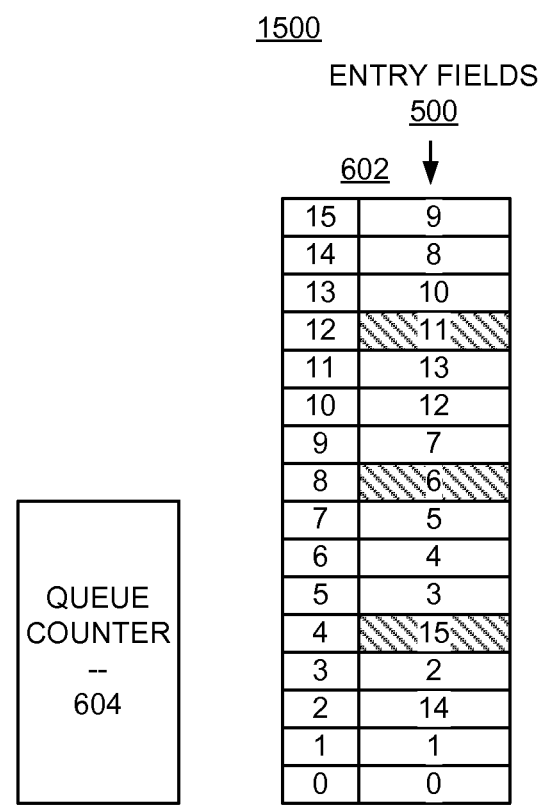
FIG. 15 is a diagram illustrating an instruction issue queue structure example for issuing oldest instructions in accordance with preferred embodiments.

Referring now to FIG. 15, there is shown an instruction issue queue structure example generally designated by the reference characters 1500 for issuing oldest instructions in accordance with preferred embodiments. In the illustrated example 1500, each of the entry fields 500 of the illustrated issue queue 602 show an age with ready queue entries of instructions 4, 8, and 12 indicated by shaded lines.

Figure 16:
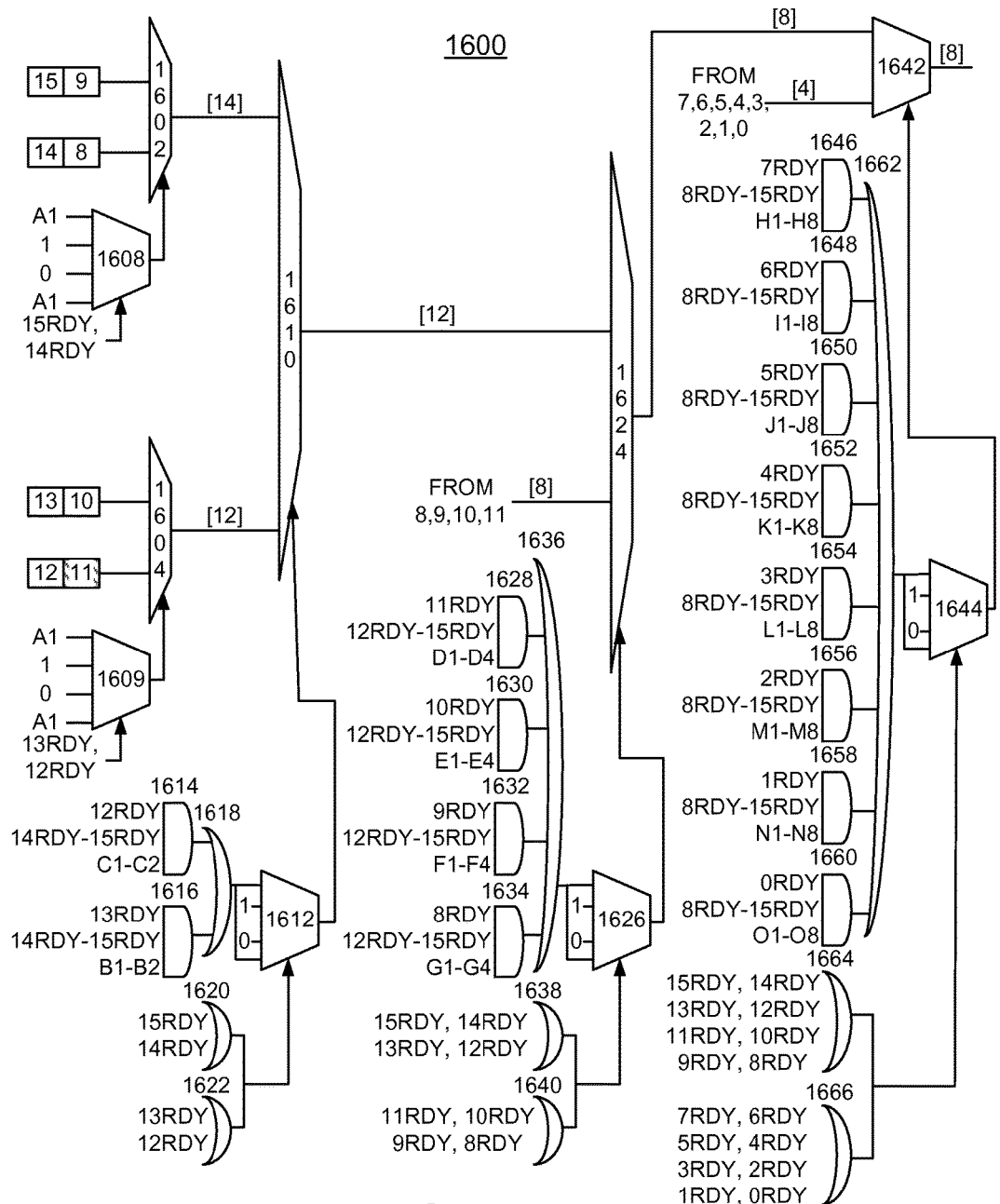
FIG. 16 is a diagram illustrating example multiplexer age check ready logic for the illustrated example of FIG. 15 for issuing oldest instructions in accordance with preferred embodiments.

FIG. 16 illustrates multiplexer age check ready logic generally designated by the reference characters 1600 for the illustrated example 1500 of FIG. 15 for issuing oldest instructions in accordance with preferred embodiments. Multiplexer age check ready logic 1600 includes a first level of multiplexers 1602, 1604 respectively receiving queue entries 14, 15 and queue entries 12, 13, and a select input from an output of a respective multiplexer 1606, 1608, each respectively receiving age matrix input of A1, 1, 0, A1 and receiving respective select inputs 14 Ready, 15 Ready and 12 Ready, 13 Ready. Outputs of multiplexers 1602, 1604 are applied to a next multiplexer 1610 receiving a select input from an output of a multiplexer 1612. A pair of AND gates 1614, 1616 respectively receiving inputs 12 RDY, 14RDY-15RDY, and C1-C2; and inputs 13RDY, 14RDY-15RDY, and B1-B2. Outputs of the AND gates 1614, 1616 are applied to an OR gate 1618, which provides inputs to the multiplexer 1612, which receives a select input from the outputs of a pair of OR gates 1620, 1622, respectively receiving inputs 15 RDY and 14 RDY, and inputs 13 RDY and 12 RDY.

The output of multiplexer 1610 is applied to an input of a next multiplexer 1624 receiving a select input from an output of a multiplexer 1626. A second input applied to multiplexer 1624 is from the instructions 8, 9, 10, and 11. Two pairs of AND gates 1628, 1630, 1632, 1634 respectively receiving inputs 11 RDY, 12RDY-15RDY, and D1-D4; inputs 10 RDY, 12RDY-15RDY, and E1-E4; inputs 9 RDY, 12RDY-15RDY, and F1-F4; and inputs 8 RDY, 12RDY-15RDY, and G1-G4. The outputs of the AND gates 1628, 1630, 1632, 1634 are applied to an OR gate 1646, which provides inputs to the multiplexer 1636, which receives a select input from the outputs of a pair of OR gates 1638, 1640, respectively receiving inputs 15 RDY, and 14 RDY, 13 RDY and 12 RDY and inputs 11 RDY, and 10 RDY, 9 RDY and 8 RDY.

The output of multiplexer 1624 is applied to an input of a next multiplexer 1642 receiving a select input from an output of a multiplexer 1644. A second input applied to multiplexer 1642 is from the instructions 0, 1, 2, 3, 4, 5, 6, and 7. Four pairs of AND gates 1646, 1648, 1650, 1652, 1654, 1656, 1658, 1660 respectively receiving inputs 7 RDY, 8RDY-15RDY, and H1-H8; inputs 6 RDY, 8RDY-15RDY, and I1-18; inputs 5 RDY, 8RDY-15RDY, and J1-J8; inputs 4 RDY, 8RDY-15RDY, and K1-K8; inputs 3 RDY, 8RDY-15RDY, and L1-L8; inputs 2 RDY, 8RDY-15RDY, and M1-M8; inputs 1 RDY, 8RDY-15RDY, and N1-N8; and inputs 0 RDY, 8RDY-15RDY, and O1-O8. The outputs of the AND gates 1646, 1648, 1650, 1652, 1654, 1656, 1658, 1660 are applied to an OR gate 1662, which provides inputs to the multiplexer 1644, which receives a select input from the outputs of a pair of OR gates 1664, 1666, respectively receiving inputs 15 RDY, 14 RDY; 13 RDY, 12 RDY; 11 RDY, 10 RDY; and 9 RDY, 8 RDY; and inputs 7 RDY, 6 RDY; 5 RDY, 4 RDY; 3 RDY, 2 RDY; and 1 RDY, 0 RDY.

In the multiplexer age check ready logic 1600, input gating to the respective multiplexers 1608, 1609, 1626, and 1644 that provide select signal inputs prevents ages from overriding multiplexers; only looking at ages if both entries are ready.

Figure 17:
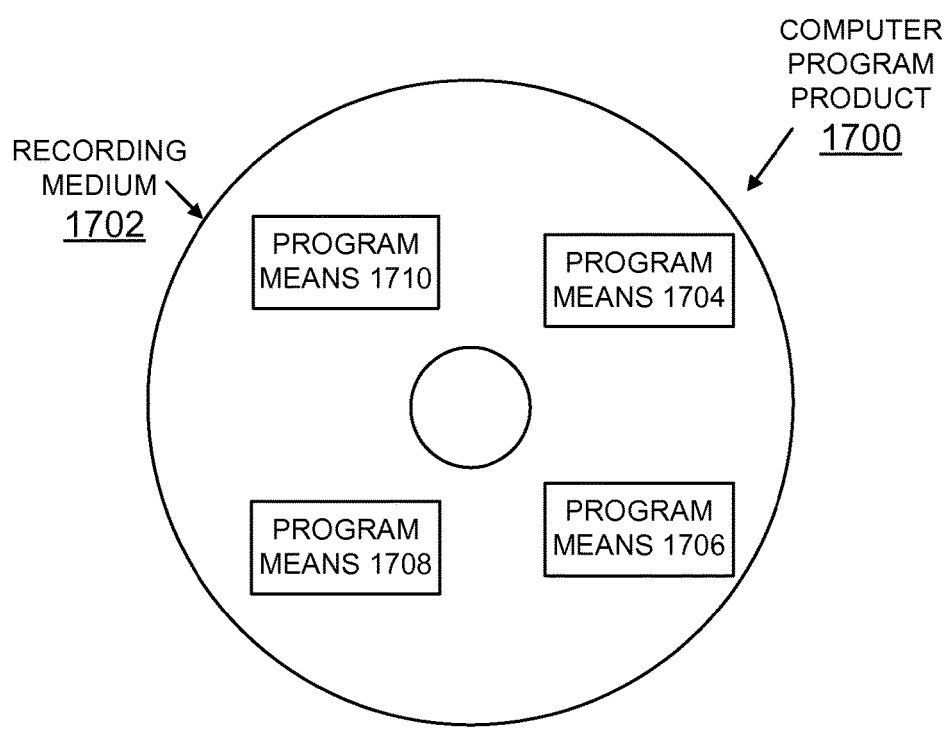
FIG. 17 is a block diagram illustrating a computer program product in accordance with the preferred embodiment.

Referring now to FIG. 17, an article of manufacture or a computer program product 1700 of the invention is illustrated. The computer program product 1700 is tangibly embodied on a non-transitory computer readable storage medium that includes a recording medium 1702, such as, a floppy disk, a high capacity read only memory in the form of an optically read compact disk or CD-ROM, a tape, or another similar computer program product. Recording medium 1702 stores program means 1704, 1706, 1708, and 1710 on the medium 1702 for carrying out the methods for implementing enhanced out of order processor instruction issue queues of the preferred embodiment in the computer system 100 of FIG. 1.

A sequence of program instructions or a logical assembly of one or more interrelated modules defined by the recorded program means 1704, 1706, 1708, and 1710, direct the memory system 100 for implementing enhanced out of order processor instruction issue queues of the preferred embodiments.

While the present invention has been described with reference to the details of the embodiments of the invention shown in the drawing, these details are not intended to limit the scope of the invention as claimed in the appended claims.

What is claimed is:

1. A method for implementing an enhanced out of order processor instruction issue queue comprising:
providing an instruction issue queue coupled to a processor;
providing queue entry logic coupled to each queue entry of said instruction issue queue for selectively accepting an instruction into a hole in said instruction issue queue and assigning age to the accepted queue entry instruction using a queue counter;
providing issue logic coupled to said instruction issue queue for selectively issuing an instruction from the instruction issue queue based upon resources being ready and ages of queue entry instructions to enable issuing an instruction based upon being the oldest instruction only with dependencies of the instruction being ready, and without requiring instruction shifting in the instruction issue queue;
selectively decrementing ages of the queue entry instructions and decrementing the queue counter, responsive to issuing the instruction, feeding back an age of the issued instruction to each queue entry, and comparing the age of the issued instruction to a respective age of each queue entry instruction, and decrementing the respective queue entry instruction age when younger than the issued instruction age.

2. The method as recited in claim 1 wherein selectively accepting instructions into the instruction issue queue includes maintaining an age of a next incoming instruction in the queue counter and providing input logic with each queue entry to determine whether a new instruction will be accepted or current queue data will be held.

3. The method as recited in claim 2 wherein each said queue entry logic checks whether the current queue entry is empty and whether there is any empty queue entry below the current queue entry before accepting the new instruction.

4. The method as recited in claim 3 includes accepting the new instruction into a current queue entry if both the current queue entry is empty and there is not an empty queue entry instruction below the current queue entry, and appending the counter value representing the age of the new instruction to the new instruction written into the queue.

5. The method as recited in claim 1 wherein selectively issuing queue entry instructions from the instruction issue queue based upon resources being ready and ages of the instructions includes providing a series of multiplexer levels used for filtering the queue entries down to a ready instruction that is the oldest.

6. The method as recited in claim 5 includes providing an age matrix used to track age relationships of the valid queue entries to each other.

7. The method as recited in claim 5 wherein the instruction issue queue includes sixteen entries and the series of multiplexer levels filters down the queue entries by sequentially comparing two queue entries, four entries, eight entries and sixteen entries.

8. The method as recited in claim 1 wherein selectively decrementing ages of the queue entry instructions and decrementing the queue counter, responsive to issuing an instruction includes decrementing the ages of all instructions younger than the issued instruction.

* * * * *